US011430209B2

(12) United States Patent
Cai et al.

(10) Patent No.: US 11,430,209 B2
(45) Date of Patent: Aug. 30, 2022

(54) IMAGE SIGNAL PROCESSING METHOD, APPARATUS, AND DEVICE

(71) Applicant: HUAWEI TECHNOLOGIES CO., LTD., Guangdong (CN)

(72) Inventors: Jin Cai, Shanghai (CN); Guoxiang Liu, Shanghai (CN); Hui Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 70 days.

(21) Appl. No.: 16/844,115

(22) Filed: Apr. 9, 2020

(65) Prior Publication Data

US 2020/0234044 A1 Jul. 23, 2020

Related U.S. Application Data

(63) Continuation of application No. PCT/CN2018/104678, filed on Sep. 7, 2018.

(30) Foreign Application Priority Data

Oct. 13, 2017 (CN) .......................... 201710952413.3

(51) Int. Cl.
*G06T 7/00* (2017.01)
*G06V 20/10* (2022.01)
(Continued)

(52) U.S. Cl.
CPC ........... *G06V 20/10* (2022.01); *G06K 9/6262* (2013.01); *G06N 3/04* (2013.01); *G06N 3/08* (2013.01);
(Continued)

(58) Field of Classification Search
CPC .. G06K 9/00664; G06K 9/6262; G06K 9/627; G06K 9/00684; G06T 7/70;
(Continued)

(56) References Cited

U.S. PATENT DOCUMENTS

2005/0105776 A1 5/2005 Luo et al.
2010/0014776 A1* 1/2010 Marchesotti ........... H04N 5/235
382/275
(Continued)

FOREIGN PATENT DOCUMENTS

CN 105224984 A 1/2016
CN 105302872 A 2/2016
(Continued)

OTHER PUBLICATIONS

Extended European Search Report issued in European Application No. 18867060.8 dated Oct. 21, 2020, 9 pages.
(Continued)

*Primary Examiner* — Ping Y Hsieh
(74) *Attorney, Agent, or Firm* — Fish & Richardson P.C.

(57) ABSTRACT

The present disclosure relates to image signal processing methods, apparatus, and devices. One example image signal processing method includes obtaining an image signal, where the image signal is derived based on a sensor signal collected by an image sensor, recognizing, by using a neural network, a scene to which the image signal belongs, determining, by using attribute information of the image signal, whether the scene is accurate, and in response to determining that the scene is accurate, performing enhancement processing on the image signal based on the scene to generate an enhanced image signal.

19 Claims, 5 Drawing Sheets

(51) Int. Cl.
*G06T 7/70* (2017.01)
*G06K 9/62* (2022.01)
*G06N 3/04* (2006.01)
*G06N 3/08* (2006.01)
*G06T 5/00* (2006.01)
*H04N 5/235* (2006.01)

(52) U.S. Cl.
CPC .......... *G06T 5/00* (2013.01); *G06T 7/70* (2017.01); *H04N 5/2351* (2013.01); *G06T 2207/20084* (2013.01)

(58) Field of Classification Search
CPC . G06T 5/00; G06T 2207/20084; G06T 5/001; G06N 3/04; G06N 3/08; G06N 3/0445; G06N 3/0481; G06N 3/0454; H04N 5/2351; H04N 5/23229; H04N 5/232; H04N 5/335
See application file for complete search history.

(56) References Cited

U.S. PATENT DOCUMENTS

2016/0071010 A1 3/2016 Tian et al.
2016/0277724 A1* 9/2016 Linaker ................ H04N 5/2226

FOREIGN PATENT DOCUMENTS

| | | |
|---|---|---|
| CN | 105678278 A | 6/2016 |
| CN | 106250866 A | 12/2016 |
| CN | 106534707 A | 3/2017 |
| CN | 107040726 A | 8/2017 |
| CN | 107194318 A | 9/2017 |
| WO | 2015159323 A1 | 10/2015 |
| WO | 2017177005 A1 | 10/2017 |

OTHER PUBLICATIONS

Gharbi et al., "Deep bilateral learning for real-time image enhancement," ACM Transactions on Graphics, vol. 36, No. 4, Jul. 20, 2017, 12 pages.

Yuan et al., "Scene Recognition by Manifold Regularized Deep Learning Architecture," IEEE Transactions on Neural Networks and Learning Systems, vol. 26, No. 10, Oct. 1, 2015 12 pages.

Office Action issued in Chinese Application No. 201710952413.3 dated Nov. 21, 2019, 15 pages (With English Translation).

PCT International Search Report and Written Opinion in International Application No. PCT/CN2018/104,678, dated Nov. 28, 2018, 13 pages (With English Translation).

* cited by examiner

IMAGE SIGNAL PROCESSING METHOD, APPARATUS, AND DEVICE

CROSS-REFERENCE TO RELATED APPLICATIONS

This application is a continuation of International Application No. PCT/CN2018/104678, filed on Sep. 7, 2018, which claims priority to Chinese Patent Application No. 201710952413.3, filed on Oct. 13, 2017. The disclosures of the aforementioned applications are hereby incorporated by reference in their entireties.

TECHNICAL FIELD

This application relates to the field of image processing technologies, and in particular, to an image signal processing method, apparatus, and device.

BACKGROUND

With development of science and technology, mobile terminals with photographing and video recording functions, such as mobile phones or tablet computers, have been widely used by people.

To enable a user to take a high-quality photo or record a high-quality video, the mobile terminal usually has a scene recognition function. After collecting a sensor signal by using an image sensor, the mobile terminal processes the sensor signal into an image signal, recognizes, by using the scene recognition function, a scene to which the image signal belongs, and processes, by using an image signal processor (ISP), the image signal into an image signal that meets the recognized scene.

Currently, the mobile terminal may perform scene recognition based on a color channel, template matching, or the like, or the mobile terminal may complete scene recognition with assistance of an additional light measurement device. However, these conventional scene recognition methods have a relatively high false recognition rate. For example, when a green plant scene is recognized by using the color channel, another green object (non-green plant) is easily recognized as a green plant. For another example, when night scene recognition is completed with the assistance of the additional light measurement device, a night scene is incorrectly recognized when the light measurement device is blocked or in another dark light scene.

Therefore, a scene is recognized by using an existing scene recognition method, and scene recognition accuracy is relatively low. In this way, quality of image signal processing may be affected, and quality of taking a photo by the user or recording a video by the user is further affected.

SUMMARY

Embodiments of this application provide an image signal processing method, apparatus, and device, to preliminarily recognize a scene by using a neural network, and then further determine accuracy of the preliminarily recognized scene by using attribute information of an image signal, so as to increase scene recognition accuracy. If determining that the scene is accurate, enhancement processing is performed on the image signal based on the recognized scene, to generate an enhanced image signal. In this way, quality of image signal processing is further increased.

According to a first aspect, an image signal processing method is provided. In the method, a scene to which an image signal belongs is recognized by using a neural network, and when determining that the scene recognized by using the neural network is accurate, enhancement processing is performed on the image signal based on the recognized scene, to generate an enhanced image signal.

According to the image signal processing method provided in this embodiment of this application, the scene to which the image signal belongs is recognized by using the neural network, and accuracy of the scene recognized by using the neural network is further determined. This can increase scene recognition accuracy. In addition, the enhancement processing is performed on the image signal based on the recognized accurate scene, to generate the enhanced image signal. This can improve quality of image signal processing to some extent.

In a possible design, the image signal recognized by using the neural network is derived based on a sensor signal collected by an image sensor, and whether the scene recognized by using the neural network is accurate may be determined by using attribute information of the image signal, and if determining that the recognized scene is accurate, the enhancement processing is performed on the image signal based on the recognized scene, to generate the enhanced image signal.

The attribute information of the image signal in this embodiment of this application may be at least one of light intensity information and foreground location information in the image signal.

In a possible example, the attribute information of the image signal includes the light intensity information. When whether the scene recognized by using the neural network is accurate is determined by using the attribute information of the image signal, it may be determined, based on the light intensity information, whether a light intensity of the image signal is within a preset light intensity threshold range, to determine whether the scene recognized by using the neural network is accurate.

In another possible example, the attribute information of the image signal includes the foreground location information. When whether the scene recognized by using the neural network is accurate is determined by using the attribute information of the image signal, it may be determined, based on the foreground location information, whether a foreground location of the image signal is within a preset distance threshold range, to determine whether the scene recognized by using the neural network is accurate.

Further, the image signal recognized by using the neural network may be an image signal obtained by processing the sensor signal by using an image signal processor, and the attribute information of the image signal is attribute information of the image signal obtained by processing the sensor signal by using the image signal processor.

In another possible design, in this embodiment of this application, an enhancement algorithm used to perform enhancement processing on each scene may be preset. When the enhancement processing is performed on the image signal based on the recognized scene, the enhancement processing may be performed on the image signal by using an enhancement algorithm corresponding to the recognized scene.

In still another possible design, in this embodiment of this application, the scene to which the image signal belongs may be recognized by using a neural network operation processor.

Further, the enhancement processing is performed on the image signal by using an image signal processor, or the enhancement processing may be performed on the image signal by using an operation processor, or the enhancement processing may be performed on the image signal by using an image signal processor and an operation processor.

Further, in this embodiment of this application, a process of determining, by using attribute information of the image signal, whether the scene is accurate may be performed by using the image signal processor, or a process of determining, by using attribute information of the image signal, whether the scene is accurate may be performed by using the operation processor, or a process of determining, by using attribute information of the image signal, whether the scene is accurate may be performed by using the image signal processor and the operation processor.

In this embodiment of this application, the scene to which the image signal belongs is recognized by using the neural network operation processor, and the operation processor and the image signal processor may assist in determining the accuracy of the scene recognized by using the neural network operation processor. This can increase scene recognition accuracy.

According to a second aspect, an image signal processing apparatus is provided. The image signal processing apparatus has functions of implementing image signal processing in the foregoing method designs. These functions may be implemented by hardware, or may be implemented by hardware executing corresponding software. The hardware or the software includes one or more units corresponding to the foregoing functions. The image signal processing apparatus may be applied to an electronic device having an image processing function.

In a possible design, the image signal processing apparatus includes an obtaining unit, a neural network recognition unit, and an image signal processing unit. Functions of the obtaining unit, the neural network recognition unit, and the image signal processing unit may correspond to the method steps. Details are not described herein.

According to a third aspect, an image signal processing device is provided. The image signal processing device includes an image signal processor, an operation processor, and a neural network operation processor. The image signal processing device may further include an image sensor, and the image sensor is configured to collect an external signal, and process the external signal to convert the external signal into a sensor signal. The image signal processing device may further include a memory, and the memory is configured to store program code executed by the image signal processor, the operation processor, and the neural network operation processor. The image signal processing device may further include a photographing or recording function control module, configured to implement a photographing or recording function, and perform post-processing on an image signal.

In a possible design, the image signal processor, the operation processor, and the neural network operation processor may perform corresponding functions in the image signal processing method provided in any one of the first aspect or the possible designs of the first aspect. For example, the neural network operation processor is configured to: obtain the image signal, where the image signal is derived based on the sensor signal collected by the image sensor, and recognize, by using a neural network, a scene to which the image signal belongs. At least one of the image signal processor and the operation processor is configured to determine, by using attribute information of the image signal, whether the scene recognized by using the neural network operation processor is accurate. If determining that the scene is accurate, enhancement processing is performed on the image signal based on the scene, to generate an enhanced image signal.

According to a fourth aspect, a computer-readable storage medium is provided. The computer-readable storage medium stores an instruction, and when the instruction is run on a computer, the computer is enabled to perform the image signal processing method in any one of the first aspect and the possible designs of the first aspect.

According to a fifth aspect, a computer program product including an instruction is provided. When the computer program product including the instruction runs on a computer, the computer is enabled to perform the image signal processing method in any one of the first aspect and the possible designs of the first aspect.

According to the image signal processing method, apparatus, and device provided in the embodiments of this application, the scene is preliminarily recognized by using the neural network, and then the attribute information of the image signal is used to assist in determining accuracy of the preliminarily recognized scene. This can increase scene recognition accuracy, and can further improve quality of image signal processing.

DESCRIPTION OF EMBODIMENTS

The following describes the embodiments of this application with reference to the accompanying drawings.

The image signal processing method and apparatus provided in the embodiments of this application may be applied to an electronic device. The electronic device may be a mobile device such as a mobile terminal, a mobile station (MS), or user equipment (UE), or may be a fixed device such as a fixed-line phone or a desktop computer, or may be a video monitor, or the like. The electronic device may be an image collection and processing device having an image signal collection and processing function. Alternatively, the electronic device may selectively have a wireless connection function, to provide a user with a handheld device with voice and/or data connectivity or another processing device connected to a wireless modem. For example, the electronic device may be a mobile phone (or referred to as a "cellular" phone), a computer with a mobile terminal, or the like, or may be a portable, pocket-sized, handheld, computer built-in, or in-vehicle mobile apparatus, or certainly may be a wearable device (such as a smartwatch or a smart band), a tablet computer, a personal computer (PC), a personal digital assistant (PDA), a point of sale (POS), or the like. In the embodiments of this application, the following provides description by using an example in which the electronic device is the mobile terminal.

Figure 1:
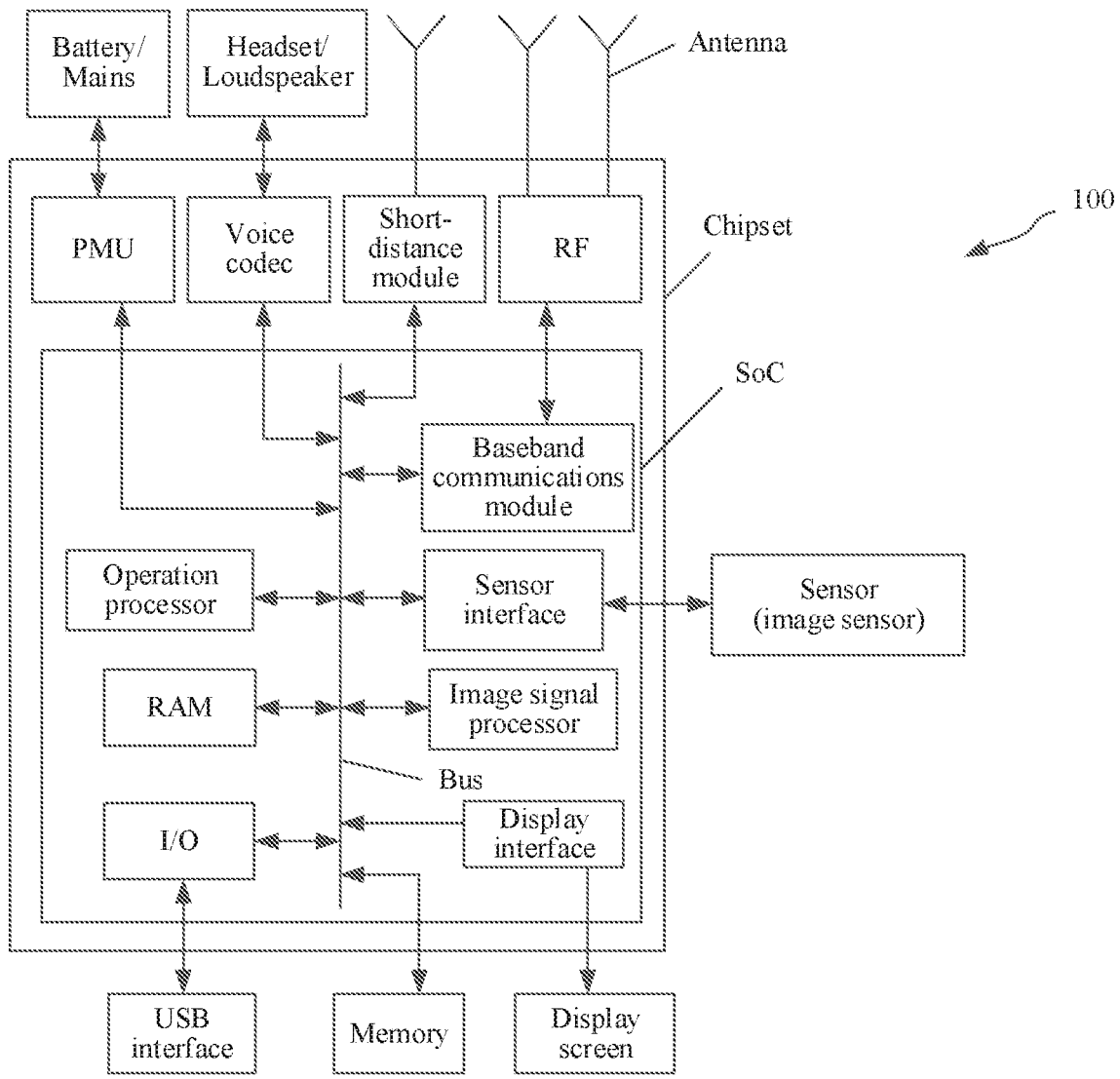
FIG. 1 is a schematic diagram of a hardware structure of a mobile terminal according to an embodiment of this application.

FIG. 1 is an optical schematic diagram of a hardware structure of a mobile terminal 100 according to an embodiment of this application.

As shown in FIG. 1, the mobile terminal 100 mainly includes a chipset and a peripheral apparatus. Components in a solid line box in FIG. 1, for example, a power management unit (PMU), a voice codec, a short-distance module, a radio frequency (RF), an operation processor, a random-access memory (RAM), input/output (I/O), a display interface, an image signal processor (ISP), a sensor hub, and a baseband communications module, constitute a chip or the chipset. Components such as a USB interface, a memory, a display screen, a battery/mains, a headset/loudspeaker, an antenna, and a sensor may be understood as peripheral apparatuses. Components in the chipset, for example, the operation processor, the RAM, the I/O, the display interface, the ISP, the sensor hub, and a baseband, may constitute a system-on-a-chip (SoC), and the system-on-a-chip is a main part of the chipset. All components in the SoC may be integrated into a complete chip, or some components in the SoC may be integrated, and the other components are not integrated. For example, the baseband communications module in the SoC may be not integrated with other parts, and become an independent part. All the components in the SoC may be connected to each other by using a bus or another connection cable. Each of the PMU, the voice codec, and the RF that are outside the SoC usually includes an analog circuit. Therefore, the PMU, the voice codec, and the RF are located outside the SoC, and are not integrated with each other.

In FIG. 1, the PMU is externally connected to the mains or the battery to supply power to the SoC, and the mains may be used to charge the battery. As a voice codec unit, the voice codec is externally connected to the headset or the loudspeaker, to implement conversion between a natural analog voice signal and a digital voice signal that can be processed by the SoC. The short-distance module may include wireless fidelity (Wi-Fi) and Bluetooth, or may optionally include an infrared module, a near field communication (NFC) module, a radio FM module, a global positioning system (GPS) module, or the like. The RF is connected to the baseband communications module in the SoC, and is configured to implement conversion between an air interface RF signal and a baseband signal, that is, frequency mixing. For a mobile phone, down-conversion is used in receiving, and up-conversion is used in sending. Both the short-distance module and the RF may have one or more antennas used to send or receive a signal. The baseband is configured to perform baseband communication, includes one or more of a plurality of communication modes, is configured to process a wireless communications protocol, and may include processing protocol layers such as a physical layer (layer 1), medium access control (MAC) (layer 2), and radio resource control (RRC) (layer 3). The baseband communications module may support various cellular communications standards, for example, long term evolution (LTE) communication. The sensor hub is an interface between the SoC and an external sensor, and is configured to collect and process data of at least one external sensor. The external sensor may be, for example, an accelerometer, a gyroscope, a control sensor, or an image sensor. The operation processor may be a general-purpose processor such as a central processing unit (CPU), or may be one or more integrated circuits such as one or more application-specific integrated circuits (ASIC), one or more digital signal processors (DSP), a microprocessor, one or more field programmable gate arrays (FPGA), or the like. The operation processor may include one or more cores, and may selectively schedule another unit. The RAM may store some intermediate data in a calculation or processing process, for example, intermediate calculation data between the CPU and the baseband. The ISP is configured to process data collected by the image sensor. The I/O is used by the SoC to interact with various external interfaces, for example, may interact with a universal serial bus (USB) interface used for data transmission. The memory may be one chip or one group of chips, and the display screen may be a touchscreen, and is connected to the bus through the display interface. The display interface may perform data processing before image display, for example, aliasing of a plurality of layers that need to be displayed, buffering of displayed data, or control and adjustment of screen brightness.

The mobile terminal 100 in this embodiment of this application includes the image sensor. The image sensor may collect an external signal such as light from outside, and process the external signal to convert the external signal into a sensor signal, that is, an electrical signal. The sensor signal may be a static image signal, or may be a dynamic video image signal. The image sensor may be, for example, a camera.

The mobile terminal 100 in this embodiment of this application further includes the ISP. The image sensor collects the sensor signal and transmits the sensor signal to the image signal processor. The ISP obtains the sensor signal, and may process the sensor signal, to obtain an image signal that meets a human eye feature in aspects such as definition, color, and brightness.

Specifically, processing an image signal by the ISP may include the following aspects.

1. Correction and compensation: defective pixel correction (DPC), black level compensation (BLC), lens distortion correction (LDC) geometric correction for distortion, stretching, deviation, or the like, gamma correction, correction related to a perspective principle, and the like.

2. Denoising and image enhancement: time domain, spatial filtering, hierarchical compensation filtering, noise removal, sharpening, ringing effect suppression and band-shaped artifact, edge enhancement, brightness enhancement, and contrast enhancement.

3. Color and format conversion: color interpolation demosaic (raw→RGB), color space conversion (RGB→YUV or YCbCr or YPbPr), tone mapping, chrominance adjustment, color correction, saturation adjustment, scaling, rotation, and the like.

4. Adaptive processing: automatic white balance, automatic exposure, automatic focus, and stroboscopic detection.

5. Visual recognition (human face and posture recognition) and image processing in an extreme environment. The extreme environment includes vibration, fast movement, a relatively dark environment, an excessively bright environment, or the like. The mentioned processing generally includes deblurring, point spread function estimation, brightness compensation, motion detection dynamic capture, image stability, high-dynamic range (HDR) image processing, or the like.

It may be understood that the ISP in this embodiment of this application may be one chip or one group of chips, to be specific, may be integrated or may be independent. For example, the ISP included in the mobile terminal 100 may be an integrated ISP chip integrated into the operation processor.

The mobile terminal 100 in this embodiment of this application has a photographing or video recording function.

When a photo is taken and a video is recorded by using the mobile terminal 100, to enable a user to take a high-quality photo or record a high-quality video, when processing the obtained sensor signal, the ISP may perform processing such as linear correction, noise removal, defect pixel repair, color interpolation, white balance correction, and exposure correction on the sensor signal by using a scene recognition function of the mobile terminal 100, so as to process the sensor signal into an image signal that meets the recognized scene. However, when scene recognition is performed by using the mobile terminal 100, accuracy of the scene recognition is currently low. In this regard, an embodiment of this application provides an image signal processing method. In the method, a method for recognizing a scene to which an image signal belongs may be separately provided. When determining that the recognized scene is accurate, an ISP performs enhancement processing on the image signal based on the accurately recognized scene, to generate an enhanced image signal. This can increase scene recognition accuracy and improve quality of image signal processing to some extent.

A neural network (NN) is a network structure for processing information by simulating a behavior feature of an animal neural network, and is also referred to as an artificial neural network (ANN) for short. The neural network may be a recurrent neural network (RNN), or may be a convolutional neural network (CNN). A neural network structure includes a large quantity of nodes (or referred to as neurons) connected to each other, input information is learned and trained based on a specific operation model to process information. One neural network includes an input layer, a hidden layer, and an output layer. The input layer is responsible for receiving an input signal, the output layer is responsible for outputting a computation result of the neural network, and the hidden layer is responsible for computation processes such as learning and training, and is a memory unit of a network. A memory function of the hidden layer is represented by a weight matrix. Generally, each neuron corresponds to one weight coefficient.

Figure 2:
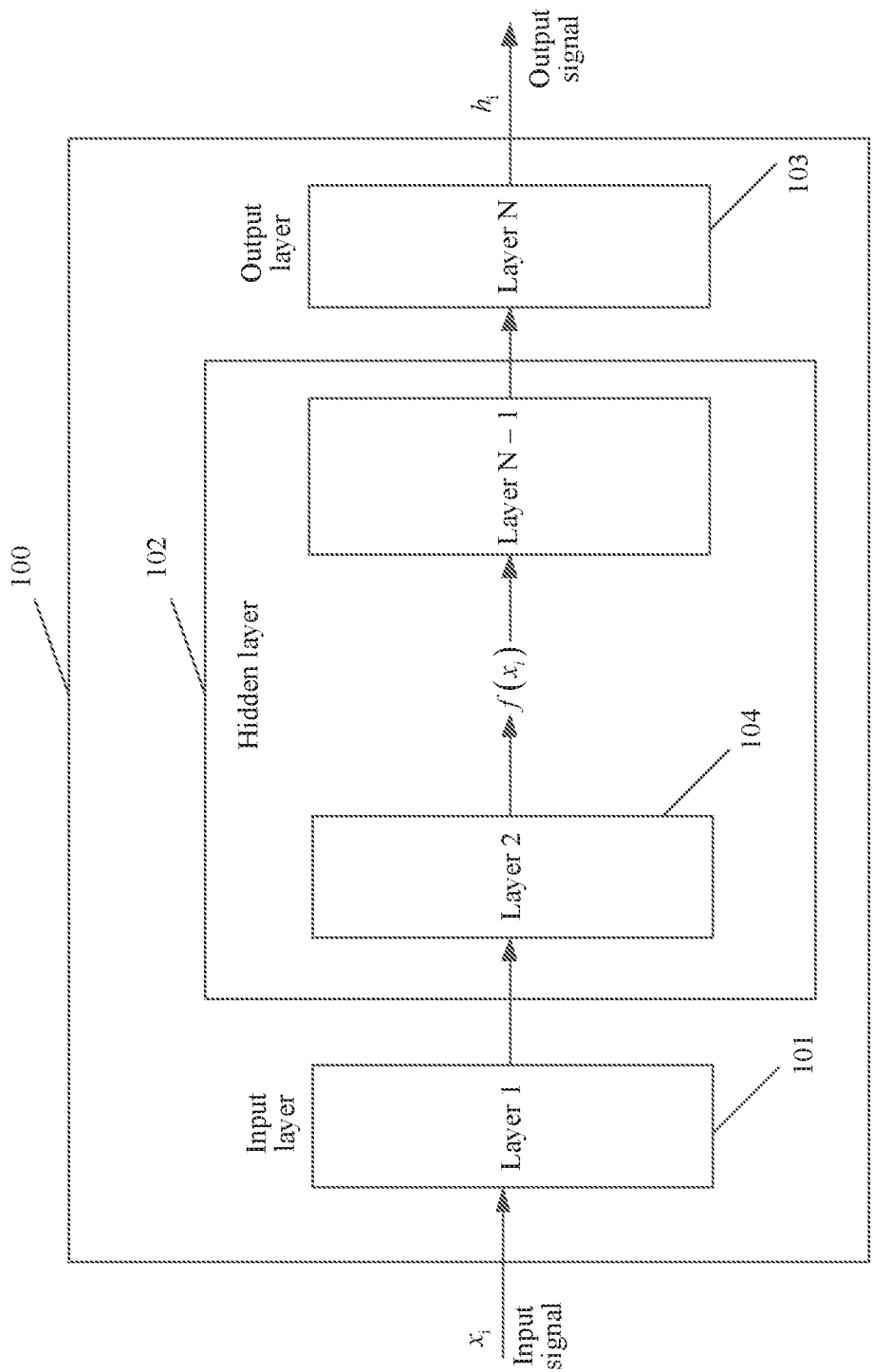
FIG. 2 is a schematic diagram of a principle of a neural network according to an embodiment of this application.

FIG. 2 is a schematic diagram of a principle of a neural network. The neural network 100 has N processing layers, where N≥3, and N is a natural number. The first layer of the neural network is an input layer 101, and is responsible for receiving an input signal. The last layer of the neural network is an output layer 103, and outputs a processing result of the neural network. Other layers other than the first layer and the last layer are intermediate layers 104, and these intermediate layers jointly constitute a hidden layer 102. Each intermediate layer of the hidden layer may receive an input signal or output a signal, and the hidden layer is responsible for a processing process of the input signal. Each layer represents a logical level of signal processing. A data signal may be processed by multilevel logic at a plurality of layers.

For ease of understanding, the following describes a processing principle of the neural network in this embodiment of this application. Processing of the neural network is usually a non-linear function $f(x_i)$, for example, $f(x_i)=\max(0, x_i)$. In some feasible embodiments, the processing function may be an activation function (rectified linear unit, ReLU), a hyperbolic tangent function (tanh), a sigmoid function (sigmoid), or the like. It is assumed that $(x_1, x_2, x_3)$ is a one-dimensional input signal matrix, $(h_1, h_2, h_3)$ is an output signal matrix, $W_{ij}$ represents weight coefficients between input $x_j$ and output $h_i$, and a matrix constituted by the weight coefficients is a weight matrix. The weight matrix W that correspond to the one-dimensional input signal matrix and the output signal matrix is shown in the formula (1):

$$W = \begin{pmatrix} W_{11} & W_{12} & W_{13} \\ W_{21} & W_{22} & W_{23} \\ W_{31} & W_{32} & W_{33} \end{pmatrix} \quad (1)$$

A relationship between an input signal and an output signal is shown in the formula (2), where $b_i$ is an offset value of a neural network processing function, and input of the neural network is adjusted based on the offset value to obtain an ideal output result.

$$h_1 = f(W_{11}x_1 + W_{12}x_2 + W_{13}x_3 + b_1)$$

$$h_2 = f(W_{21}x_1 + W_{22}x_2 + W_{23}x_3 + b_2)$$

$$h_3 = f(W_{31}x_1 + W_{32}x_2 + W_{33}x_3 + b_3) \quad (2)$$

In some feasible embodiments, the input signal of the neural network may be a signal in various forms, such as a voice signal, a text signal, an image signal, and a temperature signal. In this embodiment, the processed image signal may be various sensor signals such as a signal of a landscape shot by using a camera (the image sensor), an image signal of a community environment captured by using a surveillance device, and a human face signal obtained by using an access control system. The input signal of the neural network includes various other engineering signals that can be processed by a computer, details are not listed herein. Processing performed by the hidden layer 102 of the neural network may be processing such as recognition of a human face image signal. If deep learning is performed on an image signal by using the neural network, a scene to which the image signal belongs can be relatively accurately recognized. Therefore, in this embodiment of this application, the mobile terminal may perform the deep learning by using the neural network, to recognize the scene to which the image signal belongs.

In this embodiment of this application, to recognize the scene to which the image signal belongs by using the neural network, a neural network operation processor may be added to the mobile terminal. The neural network operation processor may be independent of the operation processor in FIG. 1, or may be integrated into the operation processor in FIG. 1. The neural network operation processor may also be understood as a special operation processor different from the operation processor in FIG. 1. For example, the neural network operation processor may be a CPU running an operating system, or may be another type of computing device, for example, a special-purpose hardware acceleration processor. In this embodiment of this application, an example in which the neural network operation processor is independent of the operation processor is used for description.

Further, in this embodiment of this application, to increase accuracy of recognizing the scene to which the image signal belongs, the accuracy of the scene recognized by using the neural network may further be determined. For example, whether the scene recognized by using the neural network is accurate may be determined by using attribute information of the image signal. When determining that the scene recognized by using the neural network is accurate, enhancement processing is performed on the image signal based on the scene recognized by using the neural network, to generate an enhanced image signal. This can increase scene recognition accuracy, and further improve quality of taking a photo by a user or recording a video by a user.

Figure 3:
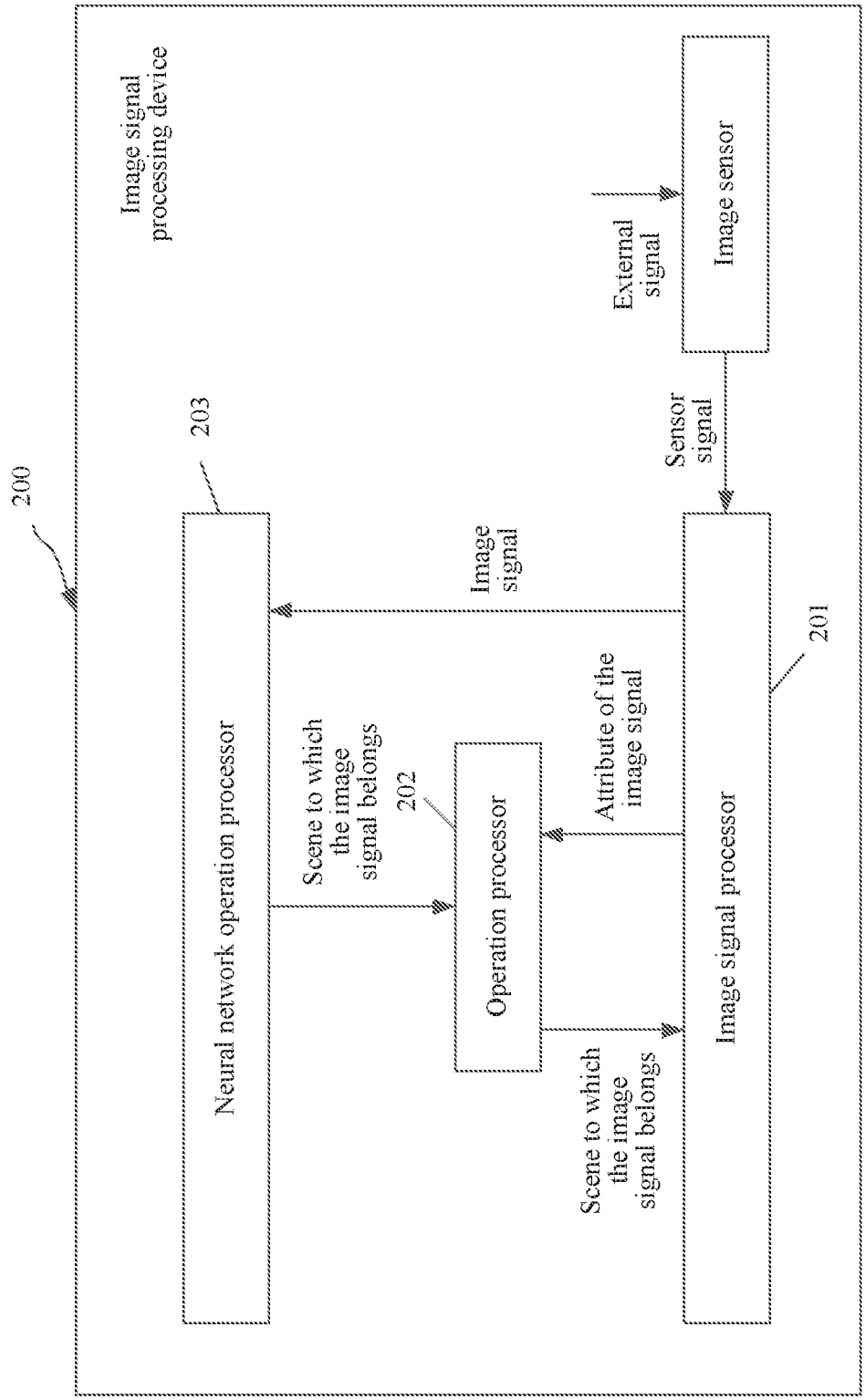
FIG. 3 is a schematic structural diagram of an image signal processing device according to an embodiment of this application.

An embodiment of this application provides an image signal processing device. The image signal processing device may be the mobile terminal 100 in the foregoing embodiment, or certainly may be another electronic device having an image signal processing function, for example, the chip, the chipset, or the like in the mobile terminal 100. FIG. 3 is a schematic structural diagram of an image signal processing device 200 according to an embodiment of this application. The image signal processing device 200 may be configured to perform the image signal processing method provided in the embodiment of this application. Referring to FIG. 3, the image signal processing device 200 includes an image signal processor 201, an operation processor 202, and a neural network operation processor 203. An image sensor, the image signal processor 201, the operation processor 202, and the neural network operation processor 203 may be connected by using a bus.

It may be understood that the schematic structural diagram of the image processing device 200 shown in FIG. 3 in this embodiment of this application is merely an example for description, and does not impose a limitation. The image processing device 200 may further include another component. For example, the image signal processing device 200 shown in FIG. 3 may further include the image sensor, and the image sensor is configured to collect an external signal, and process the external signal to convert the external signal into a sensor signal. The image signal processing device 200 shown in FIG. 3 may further include a memory, and the memory is configured to store program code executed by the image signal processor 201, the operation processor 202, and the neural network operation processor 203. The image signal processing device 200 shown in FIG. 3 may further include a photographing or recording function control module, configured to implement a photographing or recording function and mainly perform post-processing on an image signal. The photographing or recording function control module may be implemented by using software, hardware, or a combination of software and hardware. The photographing or recording function control module may be integrated into the operation processor 202, or may be integrated into the image signal processor 201. Certainly, the photographing or recording function control module may be an independent functional component.

The following describes, with reference to actual application, a process in which the image signal processing device 200 provided in the embodiment of this application performs the image signal processing method.

Figure 4:
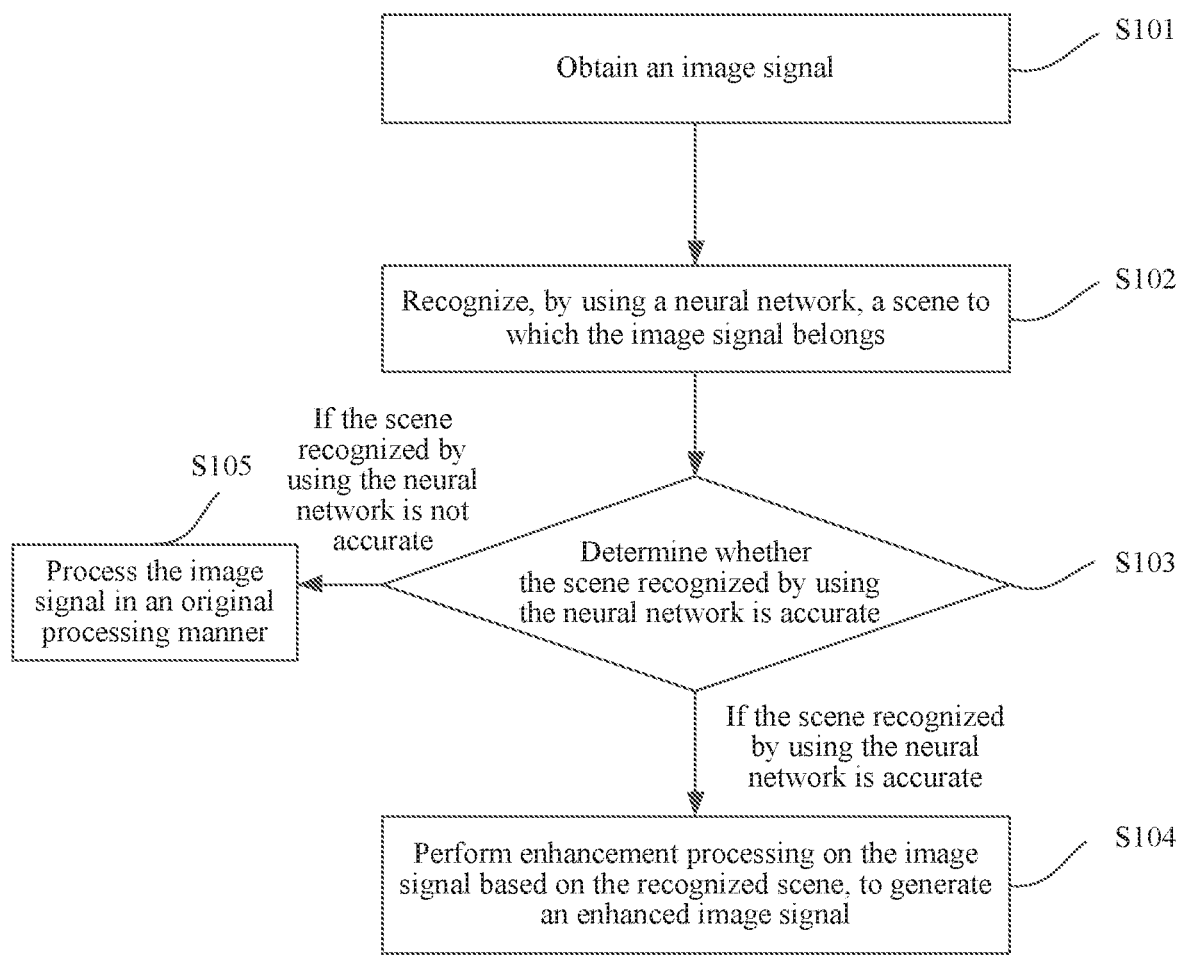
FIG. 4 is a flowchart of an image signal processing method according to an embodiment of this application.

FIG. 4 is a flowchart of an image signal processing method according to an embodiment of this application. The method shown in FIG. 4 may be performed by an image signal processing device 200, or may be performed by a component included in the image signal processing device 200, for example, a chip or a chipset. As shown in FIG. 4, the method includes the following steps.

S101: A neural network operation processor 203 obtains an image signal.

Specifically, in this embodiment of this application, the image signal obtained by the neural network operation processor 203 is derived based on a sensor signal collected by an image sensor. An external signal collected by the image sensor is processed to obtain the sensor signal. In other words, the image signal obtained in this embodiment of this application is obtained based on the sensor signal collected by the image sensor. For example, when the image sensor is a camera, the sensor signal collected by the camera is an optical signal, and the optical signal may be converted into an electrical signal after being processed by the camera. The electrical signal may be understood as an image signal. In this embodiment of this application, an image signal processor 201 of the image signal processing device 200 may obtain the sensor signal, and the image signal processor 201 may process the sensor signal to obtain the image signal.

S102: Recognize, by using a neural network, a scene to which the image signal belongs. In this embodiment of this application, the scene to which the image signal belongs is recognized by using the neural network operation processor 203.

In this embodiment of this application, to enhance processing of the image signal by the image signal processor 201, in a possible implementation, scene recognition may be performed, by using the neural network, on the image signal after being processed by the image signal processor 201. An operation processor 202 obtains the image signal after being processed by the image signal processor 201, converts the signal after being processed by the image signal processor 201 into an image signal that can be recognized by the neural network operation processor 203, and sends a converted image signal to the neural network operation processor 203. Certainly, in this embodiment of this application, the image signal processor 201 may alternatively convert the processed image signal into an image signal that can be recognized by the neural network operation processor 203, and send a converted image signal to the neural network operation processor 203.

In this embodiment of this application, the neural network used to recognize the scene to which the image signal belongs may be a convolutional neural network (CNN). At least one of models such as AlexNet, VGG16, VGG19, ResNet, and inception Net may be selected as a model used when the convolutional neural network performs the scene recognition. This is not limited in this embodiment of this application.

In this embodiment of this application, the convolutional neural network may be designed to model image signal learning, to recognize a stage scene, a night scene, a blue sky scene, a green plant scene, a flower scene, a food scene, a beach scene, a snow scene, a text scene, and an animal scene (a cat or and a dog), so as to meet scenes daily required by a user during photographing or video recording.

S103: Determine whether the scene recognized by using the neural network is accurate. Specifically, in this embodiment of this application, whether the scene recognized by using the neural network is accurate may be determined by using attribute information of the image signal.

In a possible implementation, when scene accuracy is determined, whether the scene recognized by using the neural network is accurate may be determined by using the attribute information of the image signal obtained by processing the image signal by the image signal processor 201.

In this embodiment of this application, the attribute information of the image signal may include at least one of light intensity information and foreground location information in the image signal. The light intensity information may reflect brightness of a corresponding image, and the foreground location information may reflect a distance from a foreground in a corresponding image to the image signal processing device 200.

In this embodiment of this application, whether the scene recognized by using the neural network is accurate may be determined based on actual experience. For example, the blue sky scene is usually relatively bright, the night scene is usually relatively dark, or the food scene is usually at a close range. A correspondence between the scene to which the image signal belongs and the attribute information of the image signal is preset, and different scenes match different image signal attributes. For example, in this embodiment of this application, a light intensity threshold range and a distance threshold range corresponding to each scene may be preset, as shown in Table 1.

TABLE 1

| Scene | Attribute information of an image signal |
|---|---|
| Stage | Light intensity is less than a first preset light intensity threshold, and is within a first light intensity threshold range. |
| Blue sky | Light intensity is greater than a second preset light intensity threshold, and is within a second light intensity threshold range. |
| Night scene | Light intensity is less than a preset third light intensity threshold, and is within a third light intensity threshold range. |
| Green plant | No |
| Flower | No |
| Food | A foreground location is less than a preset first distance threshold, and is within a first distance threshold range. |
| Beach | Light intensity is greater than a fourth preset light intensity threshold, and is within a fourth light intensity threshold range. |
| Firework | Light intensity is less than a fifth preset light intensity threshold, and is within a fifth light intensity threshold range. |
| Cat or dog | No |
| Text | No |
| Snow scene | No |

Various distance thresholds and various light intensity thresholds in Table 1 are all set based on actual scenes. Specific preset values are not limited in this embodiment of this application. In addition, "first", "second", and the like are merely intended to distinguish different thresholds, and is not intended to indicate a specific order or sequence. For example, in this embodiment of this application, the first light intensity threshold, the second light intensity threshold, the third light intensity threshold, the fourth light intensity threshold, and the fifth light intensity threshold are merely used for ease of description and differentiation of different light intensity thresholds, and do not constitute a limitation on the light intensity thresholds. It should be understood that the thresholds used in such a way are interchangeable in proper circumstances so that the embodiments of the present invention described herein can be implemented in other orders different from the order illustrated or described herein.

In this embodiment of this application, when whether the scene recognized by using the neural network is accurate is determined by using the attribute information of the image signal, it may be determined whether the scene recognized by using the neural network matches the attribute information of the image signal. If the scene recognized by using the neural network matches the attribute information of the image signal, determining that the recognized scene is accurate. If the scene recognized by using the neural network does not match the attribute information of the image signal, determining that the recognized scene is not accurate. For example, in this embodiment of this application, when the attribute information of the image signal includes the light intensity information, a light intensity threshold corresponding to each scene may be preset, and whether a light intensity of the image signal is within a preset light intensity threshold range is determined based on the obtained light intensity information of the image signal, to determine whether the recognized scene is accurate. For example, if the light intensity of the image signal is less than the first preset light intensity threshold, and is within the first light intensity threshold range, it may be determined that the scene to which the image signal belongs is the stage scene. If the scene recognized by using the neural network is the stage scene, it may be determined that the scene recognized by using the neural network is accurate. If the scene recognized by using the neural network is not the stage scene, it may be determined that the scene recognized by using the neural network is not accurate. For another example, in this embodiment of this application, when the attribute information of the image signal includes the foreground location information, a distance threshold corresponding to each scene may be preset, and whether a foreground location of the image signal is within a preset foreground location threshold range is determined based on the obtained foreground location information of the image signal, to determine whether the recognized scene is accurate. The foreground location reflects a distance from a foreground to a current device, for example, a distance from the foreground to a terminal device or a sensor. For example, the distance reflected by the foreground location of the image signal is less than the first preset foreground location threshold, and is within the first foreground location threshold range, it may be determined that the scene to which the image signal belongs is the food scene. If the scene recognized by using the neural network is the food scene, it may be determined that the scene recognized by using the neural network is accurate. If the scene recognized by using the neural network is not the food scene, it may be determined that the scene recognized by using the neural network is not accurate.

Specifically, in this embodiment of this application, the foregoing specific execution process of determining whether the scene recognized by using the neural network is accurate may be performed by the operation processor 202, or may be performed by the image signal processor 201, or may be jointly performed by the operation processor 202 and the image signal processor 201.

In this embodiment of this application, the following description uses an example in which the execution process of determining whether the scene recognized by using the neural network is accurate may be jointly performed by the operation processor 202 and the image signal processor 201. In this embodiment of this application, after recognizing the scene to which the image signal belongs, the neural network operation processor 203 sends a scene recognition result to the operation processor 202. The operation processor 202 obtains the scene recognition result, and obtains the attribute information of the image signal processed by the image signal processor 201. Whether the scene to which the image signal belongs and that is recognized by the neural network operation processor 203 is accurate is determined by using the attribute information of the image signal. If the scene to which the image signal belongs is accurate, step S104 is performed. The operation processor 202 sends accurate scene information to the image signal processor 201, and the image signal processor 201 performs enhancement processing on the image signal based on the accurate scene. If the scene to which the image signal belongs is not accurate, step S105 may be performed. The operation processor 202 may not interact with the image signal processor 201 on a result indicating whether the scene recognition is accurate, and the image signal processor 201 processes the image signal in an original processing manner. For a specific information interaction process in a specific implementation process, refer to FIG. 3.

S104: If determining that the scene recognized by using the neural network is accurate, perform enhancement processing on the image signal based on the recognized scene, to generate an enhanced image signal.

In this embodiment of this application, an enhancement algorithm used to perform the enhancement processing on the image signal in each scene may be preset, and enhancement algorithms vary with different scenes. All these algorithms may use existing algorithms in the prior art. In this embodiment of this application, the following uses enhanced algorithms corresponding to the blue sky scene, the green plant scene, and the night scene as an example for description.

An enhancement algorithm corresponding to the blue sky scene: Statistics on brightness information and color information of a blue sky region is collected based on region division, and strength is adaptively optimized; statistics on an attribute of the blue sky before color enhancement is collected: and an optimized target is determined based on a statistical result. Different weather, different clouds, and the blue sky require adaptively optimized strength to avoid unnaturalness caused due to excessive blue sky optimization. In a color optimization process, saturation is associated with brightness, and brightness of the picture blue sky region changes due to a change of picture framing. During the color optimization, an optimized saturation target is determined based on current brightness statistical information. A blue color gamut range varies with different brightness. Color gamut restriction needs to be considered when enhancing the blue sky. In the color optimization process, hue is associated with the saturation. A hue of the blue sky is overall mapped to a hue range of a memory color, and a hue difference of subjective vision under different saturation is compensated. After the color optimization is enhanced, the hue of the blue sky is more consistent with a subjective memory color. Further, during the color optimization, only a color gamut of the blue sky is optimized, and a transition effect of adjacent color gamuts is smooth and natural. An enhanced color gamut range of the blue sky scene is adaptively limited based on statistical information of the blue sky. An enhanced amplitude is smoothly transited at a boundary of the color gamut.

An enhancement algorithm corresponding to the green plant scene: A green plant recognition result is used to effectively eliminate interference of a green plant to light source information in white balance statistics, and increase white balance accuracy. In chrominance space, it is difficult to commonly distinguish data corresponding to the green plant or a light source by using a white balance statistical value. However, deep learning uses more information other than color for recognition of the green plant. A white balance algorithm is optimized to estimate chrominance coordinates of a current light source by using the recognized green plant as prior knowledge of a memory color. In this way, white balance accuracy of the green plant scene in various light environments is greatly increased. Color enhancement is performed on a color gamut of the green plant, and enhancement control is performed on the color gamut based on differences between brightness, hue, and saturation. A color gamut with low saturation and low brightness is brighter after being enhanced. In addition, after a color gamut with high saturation is enhanced, color does not overflow and color gradation still exists, and after overall enhancement, the color is bright and delicate, and has rich color gradation.

An enhancement algorithm corresponding to the night scene: For brightness features of the night scene, a synthesis algorithm in an HDR mode is specially optimized, and an algorithm control parameter is subdivided. An HDR algorithm processes a high dynamic scene and uses prior knowledge of the scene, and is different from a unified processing policy. A quantity of combined frames and an exposure policy of the combined frames are optimized, to improve brightness and a detail of a dark region, control an overexposed region, and enhance contrast. A combined image is transparent and has a high dynamic range. Further, the night scene may be further subdivided, and noise of the night sky and overall contrast of the scene are optimized. For a sub-scene in which there is the night sky in the night scene, control parameters such as brightness and contrast are specially optimized, so that the night sky is clean, and is transparent as a whole. In this way, a main part in the night scene is highlighted, and a strong night atmosphere is provided.

It may be understood that, in this embodiment of this application, the enhancement algorithm used when the enhancement processing is performed on the image signal based on the recognized scene may include an algorithm for performing pre-enhancement processing on the image signal, or may include an algorithm for performing post-enhancement processing on the image signal, or may further include algorithms for performing pre-enhancement processing and post-enhancement processing on the image signal. The enhancement algorithm may be executed by the image signal processor 201, or may be executed by the operation processor 202, or may be jointly executed by the image signal processor 201 and the operation processor 202. Specifically, if the enhancement algorithm includes the algorithms for performing enhancement pre-processing and enhancement post-processing on the image signal, and the photographing or recording function control module is integrated into the operation processor 202, the image signal processor 201 may perform the enhancement pre-processing, and the operation processor 202 may perform the enhancement post-processing. If the enhancement algorithm includes the algorithms for performing enhancement pre-processing and enhancement post-processing on the image signal, and the photographing or recording function control module is integrated into the image signal processor 201, the image signal processor 201 may include a functional module for performing pre-processing and a photographing or recording function control module for performing post-processing, and the image signal processor 201 performs the enhancement pre-processing and the enhancement post-processing. The functional module that is included in the image signal processor 201 and that is configured to perform pre-processing may be implemented by using software, hardware, or a combination of software and hardware. If the enhancement algorithm includes the algorithm for performing enhancement post-processing on the image signal, and the photographing or recording function control module is integrated into the operation processor 202, the operation processor 202 may perform the enhancement post-processing.

In this embodiment of this application, when the enhancement processing is performed on the image signal based on the recognized scene, an enhancement algorithm corresponding to the scene to which the image signal belongs and that is recognized by using the neural network operation processor 203 may be used to perform the enhancement processing on the image signal. For example, when the image signal processing method provided in this embodiment of this application is used for photographing or video recording, after the neural network operation processor 203 recognizes the scene to which the image signal belongs, the operation processor 202 determines that the scene recognized by using the neural network operation processor 203 is accurate, and may send accurately recognized scene information to the functional module that is in the image signal processor 201 and that is configured to perform the pre-processing. The functional module that is in the image signal processor 201 and that is configured to perform the pre-processing uses the algorithm for performing enhancement pre-processing to perform photographing or video recording pre-processing on the image signal. The operation processor 202 may alternatively send accurately recognized scene information to the photographing or recording function control module integrated into the image signal processor 201, to perform post-processing of photographing or video recording. When performing enhancement post-processing, the photographing or recording function control module in the image signal processor 201 may perform enhancement post-processing on an image signal obtained after pre-processing is performed by the functional module configured to perform pre-processing in the image signal processor 201.

In this embodiment of this application, the operation processor 202 controls the photographing or recording function control module to perform the post-processing of photographing or video recording, and different optimization policies may be set for different scenes. For example, the optimization policies may be set in a manner shown in Table 2.

TABLE 2

| Scene | Photographing optimization policy |
|---|---|
| Stage | A corresponding exposure time and a post-processing algorithm are selected to avoid overexposure on the stage. |
| Blue sky | A recognition result is sent to a color enhancement module, to make the blue sky bluer by using 3D Lut. |
| Night scene | A contrast curve is adjusted to make the sky transparent at night, and enter a contrast-enhanced HDR algorithm in high dynamics, so as to obtain a larger dynamic range. |
| Green plant | A recognition result is sent to a white balance module for white balance processing, so that the green plant looks greener and more vivid. Then, green is moderately enhanced by using 3D Lut to make the green more vivid. |
| Flower | Color saturation is increased to make the flower look more beautiful. |
| Food | Color of the food is adjusted to make the food look high in color saturation and contrast. |
| Beach | A recognition result is sent to a white balance module for white balance processing, so that the beach is more beautiful and sand is more vivid. |
| Firework | Contrast is adjusted to avoid image quality deterioration caused by smoke and stray light. |
| Animal | Contrast is increased and an exposure time is reduced to avoid capture blurring. A location of an animal such as a cat or a dog is sent to an auto focus (AF) module, to focus more quickly and capture more easily. |
| Text | Sharpening and contrast are enabled to increase sharpness of texts. |
| Snow scene | A recognition result is sent to a white balance module for white balance processing, to beautify the snow scene. |

S105: If determining that the scene recognized by using the neural network is not accurate, process the image signal in an original processing manner. S105 is an optional step.

In this embodiment of this application, the scene to which the image signal belongs may be recognized by using the neural network operation processor 203, and the operation processor 202 and the image signal processor 201 may assist in determining the accuracy of the scene recognized by using the neural network operation processor 203. This can increase scene recognition accuracy.

It may be understood that the schematic image signal processing device in this embodiment of the present invention includes a corresponding hardware structure and/or software module for performing each function. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

Figure 5:
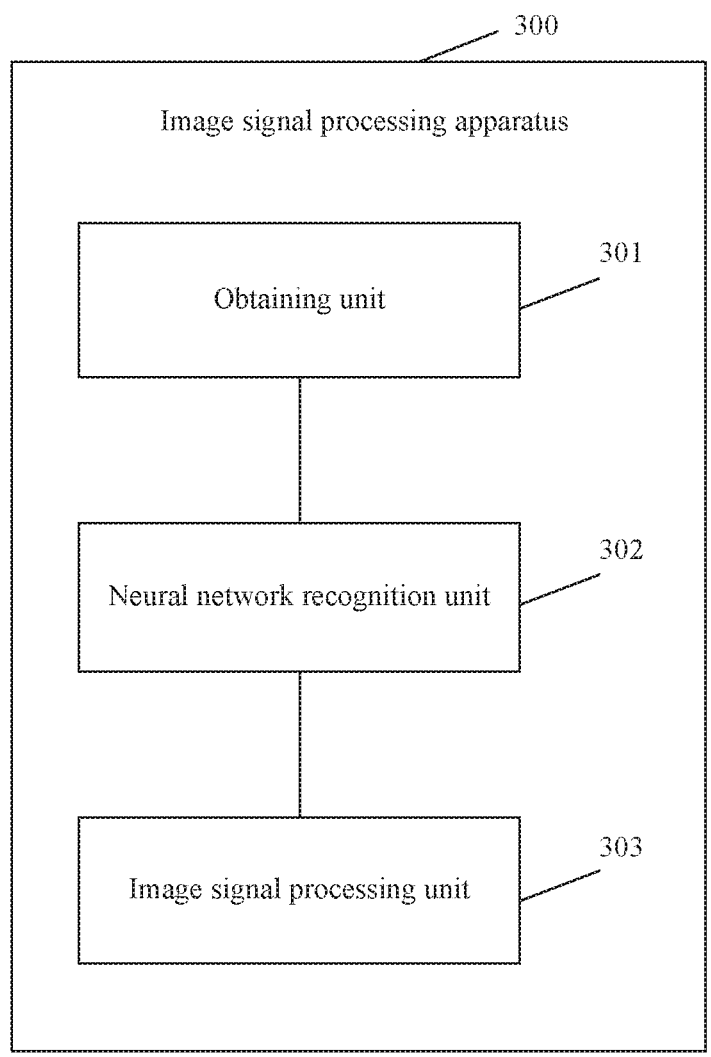
FIG. 5 is a schematic structural diagram of an image signal processing apparatus according to an embodiment of this application.

In the embodiments of this application, functional unit division may be performed on the image signal processing device based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into the units is an example, is merely logical function division, and may be other division in actual implementation. When the integrated unit is used, FIG. 5 is a schematic structural diagram of an image signal processing apparatus 300 according to an embodiment of this application. The image signal processing apparatus 300 may be configured to perform a function of the image signal processing device 200. Referring to FIG. 5, the image signal processing apparatus 300 includes an obtaining unit 301, a neural network recognition unit 302, and an image signal processing unit 303. The obtaining unit 301 may be configured to perform an execution step of obtaining an image signal in the foregoing method embodiment. The image signal may be an image signal obtained by processing, by using the image signal processing unit 303, a sensor signal collected by an image sensor. The units in FIG. 5 may be implemented by using software, hardware, or a combination of software and hardware.

The neural network recognition unit 302 may be configured to perform an execution step of recognizing, by using the neural network operation processor 203 in the foregoing method embodiment, a scene to which the image signal belongs, for example, recognizing, by using a neural network, the scene to which the image signal obtained by the obtaining unit 301 belongs.

The image signal processing unit 303 is configured to determine, by using attribute information of the image signal, whether the scene recognized by using the neural network recognition unit 302 is accurate. If determining that the scene recognized by using the neural network recognition unit 302 is accurate, enhancement processing is performed on the image signal based on the scene recognized by using the neural network recognition unit 302, to generate an enhanced image signal. The attribute information of the image signal may be attribute information of the image signal obtained by processing, by using the image signal processing unit 303, the sensor signal collected by the image sensor. The attribute information of the image signal may include at least one of light intensity information and foreground location information.

In a possible implementation, the image signal processing unit 303 may determine, based on the light intensity information, whether a light intensity of the image signal is within a preset light intensity threshold range, to determine whether the scene recognized by using the neural network recognition unit 302 is accurate.

In another possible implementation manner, the image signal processing unit 303 may determine, based on the foreground location information, whether a foreground location of the image signal is within a preset distance threshold range, to determine whether the scene recognized by using the neural network recognition unit 302 is accurate.

Specifically, in this embodiment of this application, an image processing enhancement algorithm corresponding to the scene may be preset. When performing enhancement processing on the image signal based on the scene recognized by using the neural network recognition unit 302, the image signal processing unit 303 may perform enhancement processing on the image signal by using an enhancement algorithm corresponding to the scene recognized by using the neural network recognition unit 302.

Further, the image signal processing unit 303 in this embodiment of this application may be at least one of the image signal processor 202 and the operation processor 203 in the foregoing embodiment. Therefore, the enhancement processing in this embodiment of this application may be performed by at least one of the image signal processor 202 and the operation processor 203. Furthermore, in this embodiment of this application, the foregoing execution process of determining, by using attribute information of the image signal, whether the scene recognized by using the neural network recognition unit 302 is accurate may also be performed by the at least one of the image signal processor 202 and the operation processor 203.

It should be noted that the image signal processing apparatus 300 provided in this embodiment of this application has all functions for implementing execution processes of the image signal processing method in the foregoing method embodiment. For a specific implementation process of the image signal processing apparatus 300, refer to related descriptions in the foregoing embodiment and the accompanying drawings. Details are not described herein.

According to the image signal processing method, apparatus, and device provided in the embodiments of this application, the scene is preliminarily recognized by using the neural network, and then the attribute information of the image signal is used to assist in determining accuracy of the preliminarily recognized scene. This can increase scene recognition accuracy, and can further improve quality of image signal processing.

An embodiment of this application further provides a computer-readable storage medium. The computer-readable storage medium stores an instruction, and when the instruction is run on a computer, the computer is enabled to perform the image signal processing method in the foregoing embodiment.

An embodiment of this application further provides a computer program product including an instruction. When the computer program product including the instruction runs on a computer, the computer is enabled to perform the image signal processing method in the foregoing embodiment.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or any other programmable data processing device, so that a series of operation steps are performed on the computer or any other programmable device to generate computer-implemented processing. Therefore, the instructions executed on the computer or any other programmable device provide steps for implementing a specific function in one or more processes in the flowcharts and/or in one or more blocks in the block diagrams.

Obviously, a person skilled in the art can make various modifications and variations to the embodiments of this application without departing from the scope of this application. This application is intended to cover these modifications and variations provided that they fall within the scope of protection defined by the following claims and their equivalent technologies.

The invention claimed is:

1. An image signal processing method, wherein the method comprises:
   obtaining an image signal, wherein the image signal is derived based on a sensor signal collected by an image sensor;
   recognizing, by using a neural network, a scene to which the image signal belongs;
   determining, by using attribute information of the image signal, whether the scene is accurate, wherein the attribute information of the image signal comprises light intensity information and foreground location information in the image signal; and
   in response to determining that the scene is accurate, performing enhancement processing on the image signal based on the scene to generate an enhanced image signal.

2. The method according to claim 1,
   wherein the determining, by using attribute information of the image signal, whether the scene is accurate comprises:
   determining, based on the light intensity information, whether a light intensity of the image signal is within a preset light intensity threshold range.

3. The method according to claim 1,
wherein the determining, by using attribute information of the image signal, whether the scene is accurate comprises:
determining, based on the foreground location information, whether a foreground location of the image signal is within a preset distance threshold range.

4. The method according to claim 1, wherein the image signal is an image signal obtained by processing the sensor signal by using an image signal processor; and
wherein the attribute information of the image signal is attribute information of the image signal obtained by processing the sensor signal by using the image signal processor.

5. The method according to claim 1, wherein the performing enhancement processing on the image signal based on the scene comprises:
performing the enhancement processing on the image signal by using an enhancement algorithm corresponding to the scene.

6. The method according to claim 1, wherein the enhancement processing is performed by at least one of an image signal processor or an operation processor.

7. The method according to claim 1, wherein the determining, by using attribute information of the image signal, whether the scene is accurate is executed by the at least one of an image signal processor or an operation processor.

8. The method according to claim 1, wherein the light intensity information in the image signal reflects brightness of a corresponding image, and the foreground location information in the image signal reflects a distance from a foreground in the corresponding image to an image signal processing device that comprises the image sensor.

9. The method according to claim 1, wherein determining, by using the attribute information of the image signal, whether the scene is accurate comprises:
determining, by using the attribute information of the image signal, a second scene to which the image signal belongs; and
comparing the scene with the second scene to determine whether the scene is accurate.

10. A non-transitory computer-readable storage medium storing instructions which, when executed by one or more processors, cause the one or more processors to perform operations comprising:
obtaining an image signal, wherein the image signal is derived based on a sensor signal collected by an image sensor;
recognizing, by using a neural network, a scene to which the image signal belongs;
determining, by using attribute information of the image signal, whether the scene is accurate, wherein the attribute information of the image signal comprises light intensity information and foreground location information in the image signal; and
in response to determining that the scene is accurate, performing enhancement processing on the image signal based on the scene, to generate an enhanced image signal.

11. The non-transitory computer-readable storage medium according to claim 10,
wherein the determining, by using attribute information of the image signal, whether the scene is accurate comprises:
determining, based on the light intensity information, whether a light intensity of the image signal is within a preset light intensity threshold range.

12. The non-transitory computer-readable storage medium according to claim 10,
wherein the determining, by using attribute information of the image signal, whether the scene is accurate comprises:
determining, based on the foreground location information, whether a foreground location of the image signal is within a preset distance threshold range.

13. The non-transitory computer-readable storage medium according to claim 10, wherein the image signal is an image signal obtained by processing the sensor signal by using an image signal processor; and
wherein the attribute information of the image signal is attribute information of the image signal obtained by processing the sensor signal by using the image signal processor.

14. The non-transitory computer-readable storage medium according to claim 10, wherein performing the enhancement processing on the image signal comprises performing the enhancement processing on the image signal by using an enhancement algorithm corresponding to the scene.

15. An image signal processing device, comprising an image signal processor, an operation processor, and a neural network operation processor, wherein:
the neural network operation processor is configured to:
obtain an image signal, wherein the image signal is derived based on a sensor signal collected by an image sensor; and
recognize, by using a neural network, a scene to which the image signal belongs; and
at least one of the image signal processor or the operation processor is configured to:
determine, by using attribute information of the image signal, whether the scene recognized by using the neural network operation processor is accurate, wherein the attribute information of the image signal comprises light intensity information and foreground location information in the image signal; and
in response to determining that the scene is accurate, perform enhancement processing on the image signal based on the scene to generate an enhanced image signal.

16. The image signal processing device according to claim 15,
wherein the at least one of the image signal processor or the operation processor is configured to determine, based on the light intensity information, whether a light intensity of the image signal is within a preset light intensity threshold range to determine whether the scene is accurate.

17. The image signal processing device according to claim 15,
wherein the at least one of the image signal processor or the operation processor is configured to determine, based on the foreground location information, whether a foreground location of the image signal is within a preset distance threshold range to determine whether the scene is accurate.

18. The image signal processing device according to claim 15, wherein the image signal processor is further configured to process the sensor signal collected by the image sensor to obtain the image signal and the attribute information of the image signal.

19. The image signal processing device according to claim 15, wherein the at least one of the image signal processor or the operation processor is configured to perform the enhancement processing on the image signal by using an enhancement algorithm corresponding to the scene.

* * * * *